(12) United States Patent
Labbe

(10) Patent No.: US 9,551,175 B2
(45) Date of Patent: Jan. 24, 2017

(54) HINGE FOR A MOTOR VEHICLE

(71) Applicant: GM GLOBAL TECHNOLOGY OPERATIONS LLC, Detroit, MI (US)

(72) Inventor: Klaus Labbe, Undenheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/553,616

(22) Filed: Nov. 25, 2014

(65) Prior Publication Data

US 2015/0176315 A1    Jun. 25, 2015

(30) Foreign Application Priority Data

Nov. 27, 2013 (DE) .................... 10 2013 018 079

(51) Int. Cl.
| | | |
|---|---|---|
| *E05D 3/02* | (2006.01) | |
| *B62D 25/12* | (2006.01) | |
| *E05D 7/04* | (2006.01) | |
| *E05D 5/06* | (2006.01) | |
| *E05D 11/00* | (2006.01) | |

(52) U.S. Cl.
CPC .............. *E05D 3/02* (2013.01); *B62D 25/12* (2013.01); *E05D 5/062* (2013.01); *E05D 7/04* (2013.01); *E05D 11/00* (2013.01); *E05Y 2600/626* (2013.01); *E05Y 2800/10* (2013.01); *E05Y 2900/536* (2013.01); *Y10T 16/558* (2015.01)

(58) Field of Classification Search
CPC ............. E05D 3/02; E05D 7/04; E05D 5/062; E05D 11/00; B62D 25/12; Y10T 16/558; E05Y 2600/626; E05Y 2800/10; E05Y 2900/536

See application file for complete search history.

(56) References Cited

U.S. PATENT DOCUMENTS

| 8,167,362 B2 | 5/2012 | Furumoto | |
|---|---|---|---|
| 8,726,466 B2 * | 5/2014 | Kim | ........................ B60R 21/38 16/223 |

FOREIGN PATENT DOCUMENTS

| DE | 102007053172 A1 | 5/2009 |
|---|---|---|
| JP | 2003276644 A | 10/2003 |
| JP | 2004182057 A | 7/2004 |
| JP | 2008239101 A | 10/2008 |
| JP | 2011131703 A | 7/2011 |
| WO | 2010052401 A1 | 5/2010 |
| WO | 2011055060 A1 | 5/2011 |

OTHER PUBLICATIONS

Great Britain Patent Office, Great Britain Search Report for Great Britain Application No. , date.

* cited by examiner

*Primary Examiner* — Glenn Dayoan
*Assistant Examiner* — Melissa A Black
(74) *Attorney, Agent, or Firm* — Lorenz & Kopf LLP

(57) ABSTRACT

A hinge for the pivotable arrangement of a hood or panel on the support structure of a motor vehicle is disclosed. The hinge includes a basic part and a hinge arm pivotably mounted on the basic part at a hinge axis. The basic part includes a fastening portion which is fastened to the support structure. The basic part further includes at least one mounting bracket axially spaced from the fastening portion from at least one body outside panel.

14 Claims, 4 Drawing Sheets

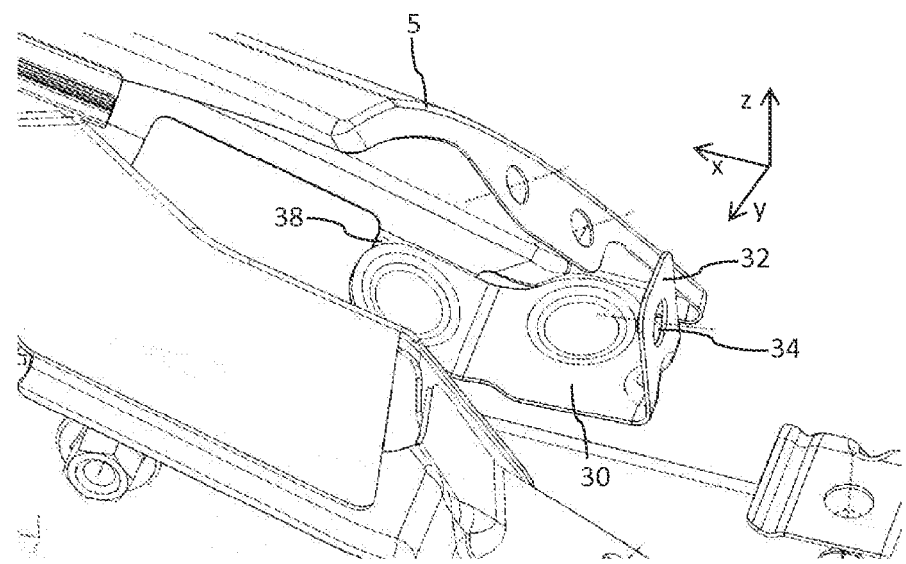
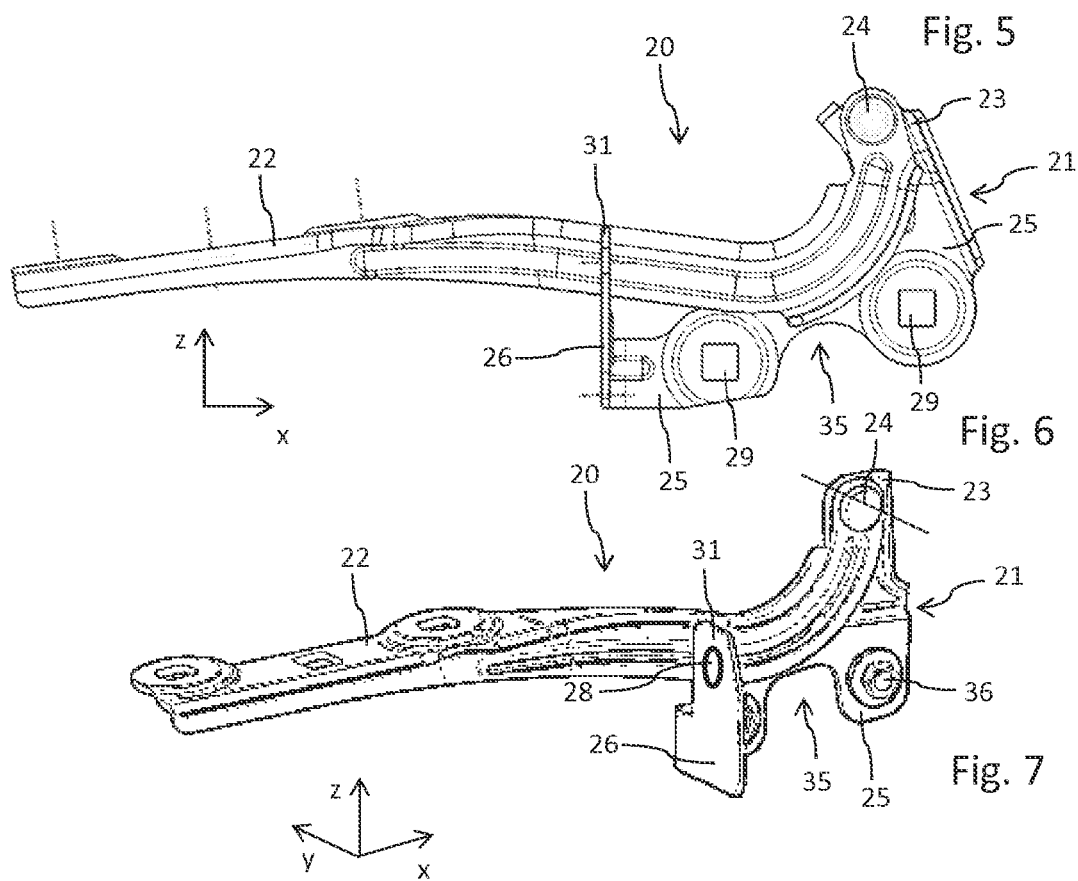

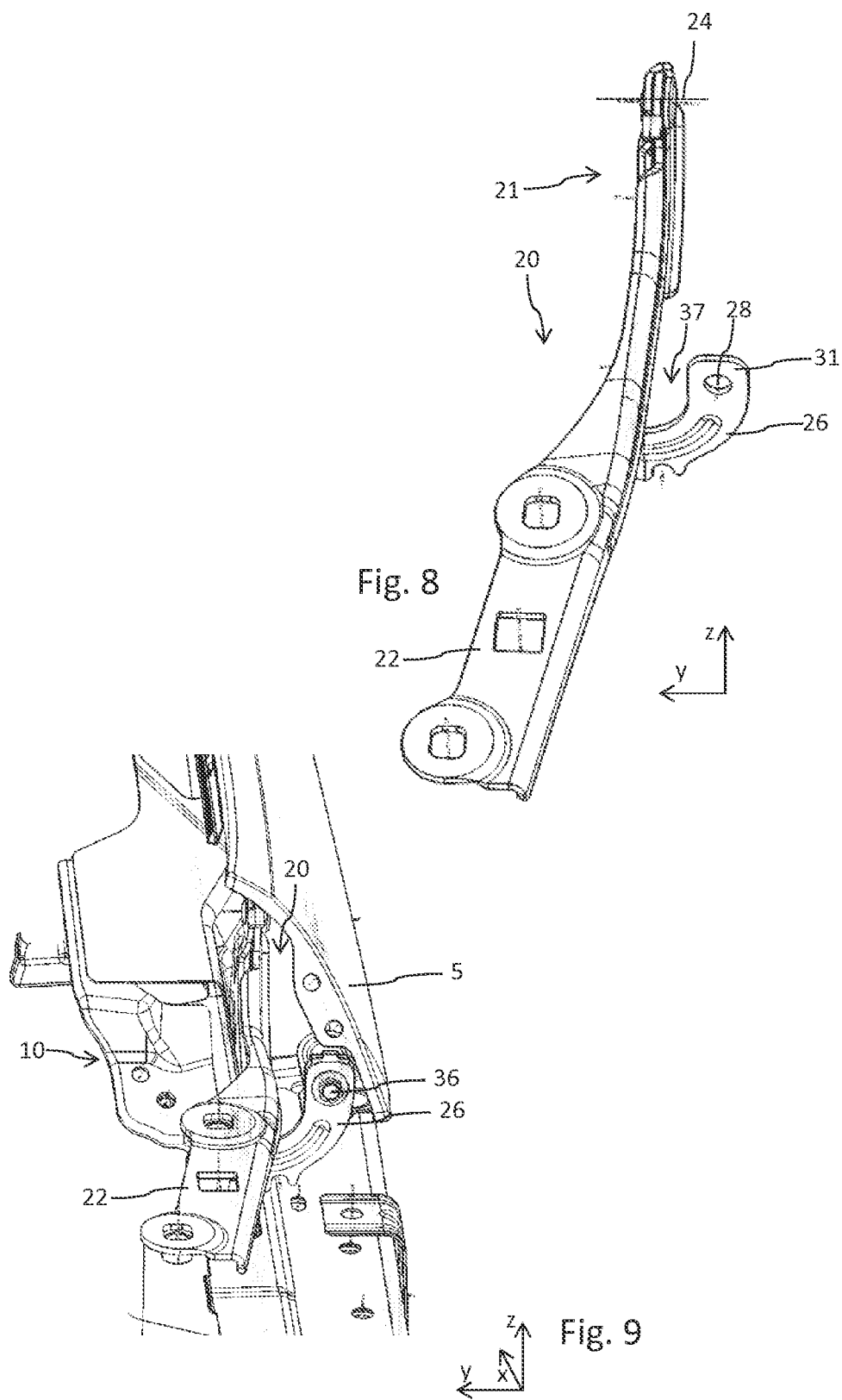

HINGE FOR A MOTOR VEHICLE

CROSS REFERENCE TO RELATED APPLICATION

This application claims priority to German Patent Application No. 102013018079.1 filed Nov. 27, 2013, which is incorporated herein by reference in its entirety.

TECHNICAL FIELD

The present disclosure relates to a hinge for a motor vehicle, in particular a hinge for the pivotable arrangement of a hood or similar movable panel to the support structure of a motor vehicle. The present disclosure furthermore relates to a motor vehicle body equipped with such a hinge and to a corresponding motor vehicle.

BACKGROUND

Hinges for the pivotable arrangement of an engine hood or other panels are known in the prior art. For example DE 10 2010 018 628 A1 describes an arrangement structure for a vehicle hood hinge, in which a rearward end part of the front hood is pivotably mounted on a motor vehicle body via a hood hinge. The hood hinge is attached to the upper end face of a lateral instrument panel front part laterally of a hollow cowl that is open at the top. The hood hinge pivotably arranges the engine hood on the motor vehicle body. The hood in its closing position borders body components, such as for example the lateral fender, and maintains a fixed preset gap dimension.

It would be advantageous to provide a hinge for the pivotable arrangement of a hood or panel to the support structure of a motor vehicle, which makes possible a tolerance-offsetting arrangement of the hood or panel with respect to bordering body components. It would also be beneficial to realize a component and weight reduction of the hinge and make possible a simple, improved and intuitive assembly of the hinge and bordering body components of the motor vehicle body.

SUMMARY

In accordance with the present disclosure, a hinge for the pivotable arrangement of a hood or similar movable panel on the support structure of a motor vehicle is provided. The hinge includes a basic part and a hinge arm. The hinge arm is pivotably mounted on the basic part with respect to a hinge axis extending in axial direction (y). The basic part includes a fastening portion fastening with the support structure of the motor vehicle. The basic part, furthermore, includes a mounting bracket for at least one body outside panel that is axially spaced from the fastening portion.

The fastening portion of the hinge can be typically arranged or fastened on one or on multiple inside body panels of the support structure of the motor vehicle body. Typically, the hinge can be fastened to the foot of an A-pillar of the support structure in the region of a structural node. For example, the fastening portion can be fastened to an A-pillar inside panel, to a fender inside panel or to a hinge pillar inside panel. In that the hinge, in particular its basic part, includes a mounting bracket that is axially spaced from the fastening portion, the hinge can simultaneously provide an assembly location for at least one body outside panel, typically for a fender outside panel or A-pillar outside panel.

The hinge thereby fulfils a dual function. On the one hand it serves for connecting the hood or panel to be pivotably mounted on the support structure, which can typically be connected in a fixed manner to the hinge arm that is pivotably mounted on the basic part. On the other hand, the hinge provides a further assembly possibility for a fixed body outside panel. In this way, the hinge can be directly connected or coupled to the hood or panel as well as to the at least one body outside panel, so that preset gap dimensions or assembly tolerances between the body components to be connected to one another via the hinge can be maintained or offset in a comparatively simple manner.

In addition, by integrating the mounting bracket in the hinge, the assembly of a separate mounting for the body outside panel can be advantageously omitted. This can result in a component and weigh reduction and simplify assembly.

According to a further configuration, the mounting bracket is connected on one piece to the fastening portion of the hinge. Accordingly, the mounting bracket can also be merely described as mounting portion of the basic part. The basic part can be formed in particular as a formed sheet metal part, wherein the axially spaced arrangement or alignment of the mounting bracket with respect to the fastening portion of the basic part can be achieved by forming the basic part. The one-piece configuration or the integration of the mounting bracket in the basic part renders separate assembly of the mounting bracket on the basic part superfluous and makes possible component and weight reduction.

According to a further configuration, the hinge arm of the hinge is axially mounted between the mounting bracket and the fastening portion. In other words, the mounting bracket and the fastening portion extend on different and opposite axial outsides of the hinge arm. With respect to a mounting position on the support structure later on, the fastening portion of the basic part, based on the vehicle transverse direction, can be arranged located inside and be fastened with an outside of the support structure.

Bordering the fastening portion towards the outside, the hinge arm, with respect to the hinge axis substantially extending in vehicle transverse direction (y) can be pivotably arranged on the basic part while the mounting bracket with respect to the fastening portion and the hinge arm, based on the vehicle transverse direction (y), is arranged located outside. The transition from the fastening portion to the mounting bracket typically penetrates an imaginary plane, in which the pivot arm is movably mounted on the basic part. The hinge arm is typically mounted in a plane that is perpendicular to the axial direction, which plane, based on the final assembly on the support structure or motor vehicle body, typically coincides with the plane formed by vehicle vertical axis (z) and vehicle longitudinal axis (x).

The arrangement of the hinge arm axially between the mounting bracket and the fastening portion makes possible in particular that the fastening portion with its side facing away from the hinge arm can be fastened to the support structure of the motor vehicle. The fastening portion can hereby come to lie against an outside of the support structure almost over the full area and accordingly be connected to the same in a fixed manner. The movability of the hinge arm is largely unaffected by this. The mounting bracket that is axially spaced from the fastening portion and from the hinge arm meanwhile makes possible connecting a body outside panel to the hinge, which in its final assembly configuration on the mounting bracket can be fastened to the hinge axially spaced from the fastening portion.

According to a further configuration, the mounting bracket extends axially away from the fastening portion. It can extend in axial direction or merely have an extension with a directional component in axial direction. Through the axial extension of the mounting bracket away from the fastening portion, the mounting bracket as a whole comes to lie axially spaced with respect to the fastening portion. The mounting bracket can in this case merge into the fastening portion via a connecting region. That connecting portion can in this case be configured as a curve or bend. By means of an axial orientation of the mounting bracket with respect to the fastening portion, a direct connection of mounting and fastening portion simultaneously realizing an axial spacing between mounting and fastening portion is possible.

According to a further configuration, the mounting bracket is formed flange-like. Furthermore, the fastening portion can be substantially configured flat so that the flange-like mounting extends at a preset angle with respect to the plane of the fastening portion. The fastening portion of the basic part can extend, in the assembly position on the support structure later on, approximately in the plane formed by the vehicle vertical axis (z) and the vehicle longitudinal axis (x), while the flange-like mounting projects axially to the outside, i.e. towards the outside in vehicle transverse direction (y).

In this regard, an angle between mounting and the plane of the fastening portion of approximately 90° is conceivable. Depending on fixed geometrical configuration of the support structure and of the hinge and of the outside panel that can be fastened to the hinge however any angular geometries between the mounting bracket and the fastening portion are also conceivable. It is conceivable in particular that the mounting bracket of the basic part, based on the final assembly position, extends on the support structure substantially in the plane formed by vehicle vertical axis (z) and vehicle transverse axis (y). It is possible, furthermore, that the flange-like mounting is inclined in the direction of the motor vehicle longitudinal axis (x) with respect to a vertical.

The extension of the flange-like mounting at a preset angle to the plane of the fastening portion gives the basic part an angular geometry which can impart increased strength and structural stiffness to the basic part. The angular arrangement and orientation of mounting and fastening portion can give the basic part increased strength, so that under certain conditions even material thicknesses as well as metal sheet thicknesses for the basic part can be reduced in order to minimize weight and costs.

According to a further configuration, the mounting bracket includes a fastening point for the body outside panel. Mounting can in particular be configured in the form of a screw hole or a slot. The screw hole or the corresponding slit in this case is typically greater by a preset dimension than the diameter of a fastening element, for example a screw bolt, so that in particular a tolerance-offsetting or adjustable mounting of the body outside panel to the mounting bracket is possible.

In that the mounting bracket and the fastening portion of the basic part extend at a preset angle to one another and in that the fastening portion also includes at least one fastening point for fastening the basic part to the support structure, adjusting possibilities in different directions or different adjusting planes can be realized via the fastening point on the mounting bracket side and also via the fastening point of the fastening portion.

According to a further aspect, a motor vehicle body with a support structure is finally provided. On that support structure, which can typically be formed by supporting components of a side wall structure, a previously described hinge is arranged. Typically, the hinge is adjustably arranged on the support structure in order to make possible a tolerance-offsetting or gap dimension-maintaining and adjustment on the one hand of the hood or the panel and on the other hand of the at least one body outside panel on the support structure.

According to a further development thereof, the fastening portion of the hinge extends in mounting position on the support structure at least in sections in the plane formed by vehicle vertical axis (z) and vehicle longitudinal axis (x). A connecting region on the support structure side for fastening the hinge typically extends likewise in the plane formed by the vehicle vertical axis (z) and vehicle longitudinal axis (x). In this way, the fastening portion of the hinge which is formed flat at least in regions can be fixed and fastened to the support structure almost over the entire area. A mutual contact position of fastening portion and support structure preferably over the full area allows providing multiple fastening points spaced from one another in the region of the fastening portion, so that a particularly secure, durable and loadable fastening of the hinge on the support structure can be provided.

According to a further configuration, the fastening portion of the hinge is adjustable fastened to the support structure. The fastening portion of the hinge can furthermore be detachably fastened to the support structure so that during the assembly process of the motor vehicle body the position of the fastening portion is adjustable or variable relative to the support structure in order to maintain or offset gap dimensions or present installation tolerances.

According to a further configuration, the fastening portion of the hinge includes at least one fastening point for connection to the support structure. The fastening point can typically be configured in the form of a screw hole or a comparable passage opening, if appropriate also in the form of a slot or an elongated hole. The fastening point of the fastening portion can be arranged in particular in alignment or coinciding with a corresponding fastening point of the support structure. A suitable fastening means, for example a screw interacting with a screw nut can be passed through the coinciding fastening points of fastening portion and support structure.

In that at least one fastening point of support structure of fastening portion includes a passage opening which is larger than the diameter of the fastening element, an adjustment of the fastening portion, consequently of the hinge can be performed relative to the support structure. If for example the fastening point of the fastening portion of the hinge in the form of a screw hole is configured larger than the diameter of a screw to be passed through there, the hinge can be adjustably fastened to the support structure at least with respect to the plane in which the fastening portion of the hinge extends.

According to a further configuration, the at least one fastening point of the fastening portion, based on the vehicle vertical axis (z), lies below a fastening point of the mounting bracket for the body outside panel. The offset in height between the fastening point of the fastening portion and the fastening point of the mounting bracket makes possible good and separate accessibility of both fastening points during or even after the mounting bracket of the hinge to the support structure and during or after the mounting bracket of the body outside panel to the hinge. In this way, the body components preassembled on the support structure can be finally adjusted with respect to their position and orientation in a final assembly process and subsequently fastened.

According to a further configuration, the at least one fastening point of the fastening portion is therefore accessible from the outside following the mounting bracket of the body outside panel to the hinge in the direction of the vehicle transverse axis (y) or in axial direction from the outside. With this configuration it is even conceivable to connect the body outside panel to the hinge in a preassembled manner, before the correspondingly preconfigured unit of hinge and body outside panel is fastened to the support structure of the motor vehicle. Furthermore, the axial or outer accessibility to the fastening point of the fastening portion makes possible subsequent adjustment of the hinge on the support structure, even when the body outside panel should already be fastened to the hinge or to its mounting.

According to a further development, the mounting bracket of the hinge in the mounting bracket position on the support structure extends at least in regions in the plane formed by vehicle vertical axis (z) and vehicle transverse axis (y). In that the mounting bracket includes a fastening point for the adjustable mounting of the body outside panel, the body outside panel because of the orientation of the mounting bracket with respect to the vehicle vertical axis (z) as well as with respect to the vehicle transverse axis (y) can be adjusted on the hinge and accordingly also with respect to the support structure of the motor vehicle body carrying the hinge. When, furthermore, the fastening portion of the hinge extends at least in sections in the plane formed by vehicle vertical axis (z) and vehicle longitudinal axis (x), and additionally likewise includes a fastening point for adjustable mounting, the body outside panel connected to the hinge can also be adjusted with respect to the support structure also regarding the vehicle longitudinal axis (z).

It must be noted here that the fastening point of the hinge as well as the mounting bracket and thus the adjusting possibility for the hood or movable panel and/or the body outside panel do not exactly run in the described planes formed by vehicle vertical axis (z), vehicle transverse axis (y) and vehicle longitudinal axis but, depending on geometrical configuration of the body components, can also deviate from the mentioned axes under preset angles of up to 30°.

According to a further configuration, the motor vehicle body includes at least one body outside panel, which can be arranged on the mounting bracket of the hinge. For fastening the body outside panel to the hinge, at least one mounting angle can be arranged on the inside of the body outside panel with a fastening strap that extends at least in regions parallel to the mounting bracket of the hinge. The fastening strap, which can be brought surface in contact with the mounting bracket of the hinge can, like the mounting bracket, be provided with a fastening point for example in the form of a passage opening or in the form of a welding nut or the like fastening elements. The fastening point in this case can be arranged aligned with or at least partly coinciding with the fastening point of the mounting bracket. In this way, with a fastening point of mounting bracket or fastening strap that is dimensioned at least adequate in size, an adjusting option can be formed in a plane in which the fastening strap extends.

The mounting angle can have an L-shaped cross-sectional profile. It can, in particular, be connected to the body outside panel in a fixed manner. It can be connected, in particular, to a lower flange portion projecting to the inside. The mounting angle can, in particular, be welded to the body outside panel or otherwise connected to the body outside panel in a materially joined manner. Instead of a welded connection it is conceivable that the mounting angle is permanently connected to the body outside panel by means of riveting, bonding or penetration-joining.

According to a further configuration, the fastening portion of the basic part of the hinge includes a cutout or a recess at a lower edge. By means of the recess the contact area of the fastening portion on the support structure on the body side is reduced by the recess of the fastening portion exposes the support structure located underneath at least in regions so that in the region of the recess for example a reinforcing element can be directly fastened to the support structure. At the same time, material and weight can be saved through the recess of the fastening portion.

According to a further aspect, a motor vehicle with a previously described motor vehicle body is finally provided, on which at least one hinge described before, for example in the form of a hood hinge, is arranged.

BRIEF DESCRIPTION OF THE DRAWINGS

The present disclosure will hereinafter be described in conjunction with the following drawing figures, wherein like numerals denote like elements.

FIG. 5 a perspective representation of the body outside panel viewed obliquely from above and inside;

FIG. 6 an isolated lateral view of a hinge;

FIG. 7 a perspective representation of the hinge according to FIG. 6;

FIG. 8 a further perspective representation of the hinge viewed in vehicle longitudinal direction obliquely from the top; and FIG. 9 a perspective representation of the hinge comparable to FIG. 8, however in assembly position on the support structure.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
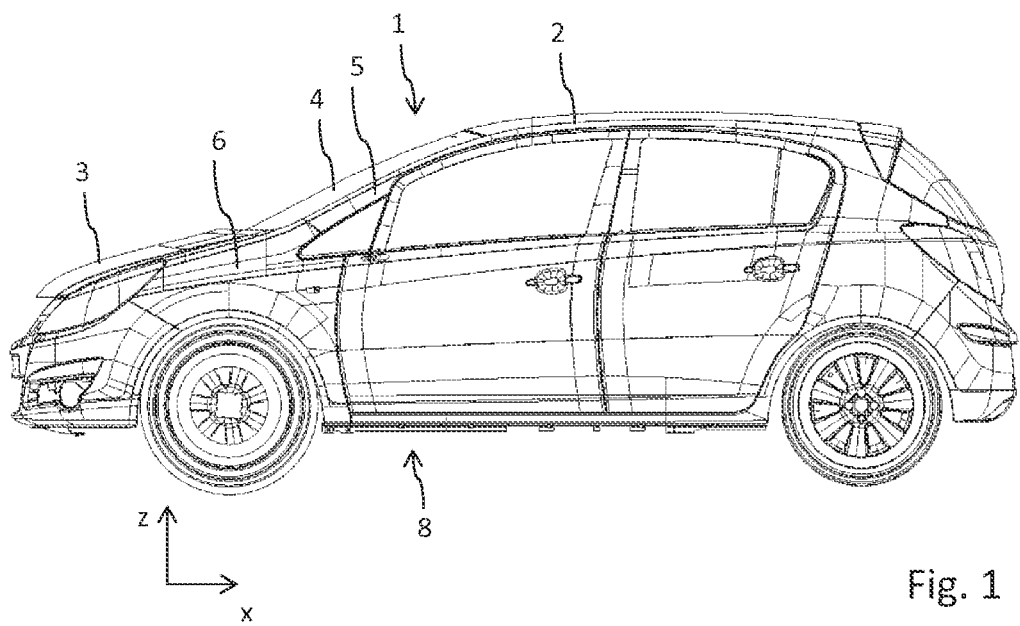
FIG. 1 a lateral view of a motor vehicle.

In FIG. 1, a motor vehicle 1 configured as a passenger car is shown in a lateral view. It includes a self-supporting body 2 with a pivotably articulated hood 3. The hood 3 extends from a lower foot portion of a sloping windshield 4 towards the front of the motor vehicle 1 in travelling direction. Bordering the hood 3 laterally and towards the bottom, a body outside panel 6 in the form of a fender extends. Against the travelling direction and upwardly, surrounding the lateral region of the windshield 4, a body outside panel 5 configured as an A-pillar outside panel extends adjoining the hood 3. While hood 3 is used in the following detailed description, other movable panels on a support structure of a motor vehicle body is within the intended scope of the present disclosure.

Figure 2:
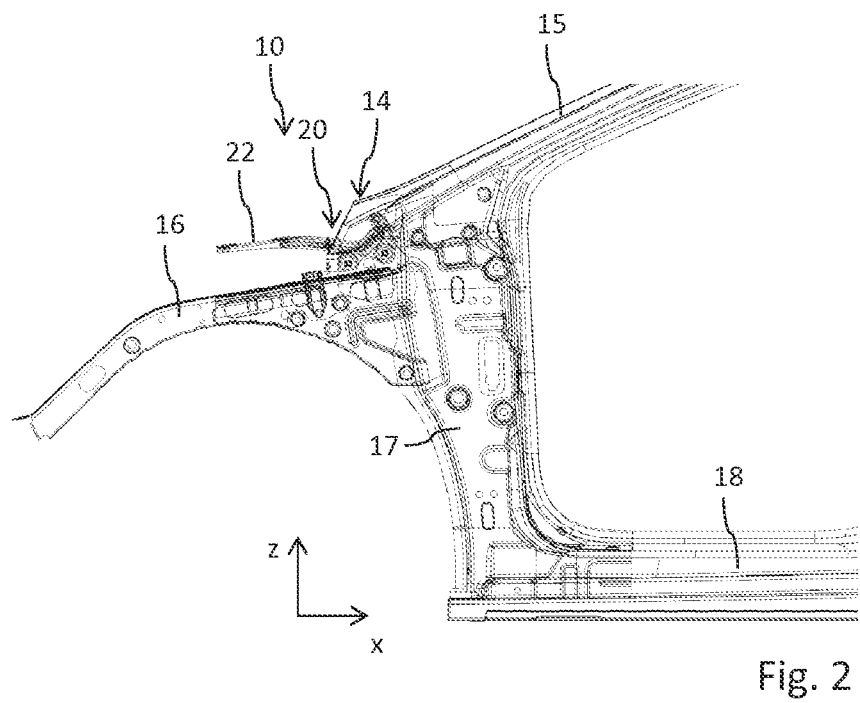
FIG. 2 a lateral view of a detail of a side wall of the support structure forming the motor vehicle body.

In the lateral view according to FIG. 2, a side wall structure of the motor vehicle body 2 which in the present context is generally described as support structure 10 is shown as a detail. The support structure 10 in this case includes an A-pillar inside panel 15, which extends obliquely upwards, against the travelling direction, from an upper end portion of a hinge pillar inside panel 17. Towards the front, bordering on the hinge pillar inside panel 17, a fender inside panel 16 is arranged. In the structural node 14 formed by A-pillar inside panel 15, fender inside panel 16 and hinge pillar inside panel 17, a hinge 20 which in FIGS. 6 to 8 is shown in an isolated manner for the pivotable arrangement of the hood 3. The lower portion of the hinge pillar inside panel 17 located below furthermore merges into a sill inside panel 18, which with an outside panel corresponding thereto forms a lateral sill indicated in FIG. 1.

The hinge 20 which in FIGS. 6 to 8 is shown isolated includes a basic part 21 which is substantially configured flat, on which a hinge arm 20 that can be connected to the hood 3 is pivotably mounted with respect to a hinge axis 24. The hinge axis 24 in the shown exemplary embodiment extends in vehicle transverse direction (y), which in the present context coincides with an axial direction. As is evident in particular in FIGS. 6 and 7, the basic part 21 includes a leg 23 projecting upwards in the direction of the vehicle vertical axis (z). At the upper end of that leg 23, the hinge arm 22 is fastened to the basic part 21 via the hinge axis 24 or via a bolt forming the hinge axis.

Facing away from the leg 23, the basic part 21 includes a fastening portion 25, which simultaneously forms a lower part of the basic part 21. In the region of the fastening portion 25, as is shown in particular in FIG. 6, two fastening points 29 which are spaced from one another, here in the form of passage openings, are formed. The clear width of the fastening points 21 is selected larger by a preset dimension than the diameter of a fastening element 36 indicated in FIGS. 3, 4 and 7, in this case configured as a screw. The support structure 10, typically its fender inside panel 16 and/or its hinge pillar inside panel 17, includes fastening points corresponding to the fastening points 29 of the basic part 21, which in mounting position of the basic part 21 come to lie on the support structure 10 aligned with or coinciding with the fastening points 29 of the latter.

Because of the fact that the clear width of the fastening points 29 of the basic part 21 have a certain clearance to the provided fastening elements 36, adjustable mounting of the basic part 21, thus of the entire hinge 20 is possible in a plane in which the support structure 10 extends. Here, the hinge 20 can be adjusted on the support structure 10 via the fastening points 29 with respect to the vehicle vertical axis (z) as well as with respect to the vehicle longitudinal axis (x).

The basic part 21 of the hinge 20 furthermore includes a mounting bracket 26 that is axially spaced from the fastening portion 25. As is evident from FIGS. 6, 7 and 8, the mounting bracket 26 extends from a lower front end portion of the basic part 21 to the outside in axial direction or to the outside in the direction of the vehicle transverse axis (y). In addition, a free end 31 of the mounting bracket 26 projects upwards in the direction of the vehicle vertical axis (z). In the basic position of the hinge shown in FIGS. 6 and 7, the free end 31 of the mounting bracket 26 comes to lie approximately at the height of the hinge arm 22. Because of its extension in axial direction, i.e. in the present case in the plane formed by the vehicle vertical axis (z) and vehicle transverse axis (y), an axial gap (37) between the mounting bracket and an outside of the hinge arm 22 is even obtained. Through the curvature protruding upwards and towards the outside or through the course of the mounting bracket 26 projecting upwards and towards the outside, an axial spacing from the hinge arm 22 and thus also a collision-free movement of the hinge arm 22 with respect to the mounting bracket 26 is obtained.

As is shown, furthermore, in FIGS. 7 and 8, a fastening point 28 is arranged at the upper free end 31 of the mounting bracket 26. The fastening point 28 in this case is formed in the manner of a passage opening which can be typically brought into alignment with a fastening point 34 of a body outside panel 5 shown from the inside in FIG. 5. The fastening points 34, 28 corresponding to one another can for example be formed as screw holes with an adequately large diameter, which makes possible adjustment of the body outside panel 5 on the mounting bracket 26, in particular in the plane coinciding with the mounting bracket 26. Instead of a passage opening, at least one of the fastening points 28, 34 can for example also include a slot or an elongated hole.

As is shown in FIG. 5, a mounting angle 30 is arranged on the inside of the body outside panel 5 for fastening the body outside panel 5 to the hinge 20. The mounting angle 30 can in particular be connected to a flange 38 projecting from the lower side of the body outside panel 5 towards the inside. Here it is conceivable that the mounting angle 30 is welded to or otherwise connected to the flange 38 which is merely rudimentarily shown in FIG. 5. On a front end portion located in travelling direction, the mounting angle 30 includes a fastening strap 32 which is bent over upwardly. In this fastening strap 32, the previously described fastening point 34 is formed. A tolerance-offsetting mounting in the direction of the vehicle vertical axis (z) and vehicle transverse axis (y) is made possible by the raised fastening strap 32 extending in assembly position substantially or approximately in the direction of the vehicle vertical axis (z) and vehicle transverse axis (y). At the same time, the mounting bracket 26 projecting upwards makes available a contact surface for the fastening strap 32, as a result of which a defined mounting position with respect to the vehicle longitudinal axis (x) is provided.

The angular, here approximately rectangular, configuration of the basic part 21 with a fastening portion 25 extending in the direction of the vehicle longitudinal axis (x) and a mounting 26 extending transversely thereto approximately in vehicle transverse direction (y) makes possible fastening and arranging the body outside panel 5 for example configured as an outer A-pillar panel, which because of the position of the mounting bracket 26 relocated towards the front in travelling direction opposite the hinge axis 24 covers and lines the region of the hinge axis 24.

As is shown, furthermore, in FIGS. 5 and 6 with the help of two basic parts 21 of a hinge 20 which are geometrically configured slightly differently, a cutout 35 is provided in the basic part 21 between the fastening points 29 which with respect to the vehicle longitudinal axis (x) are spaced from one another at the lower edge 27 of the fastening portion 25. As is shown in the mounting bracket position in the FIGS. 4 and 3, a further body component 39, for example in the form of a reinforcing component can be directly connected in the region of that cutout directly with the support structure 10 or with the hinge pillar inside panel 17 or the fender inside panel 16.

Figure 3:
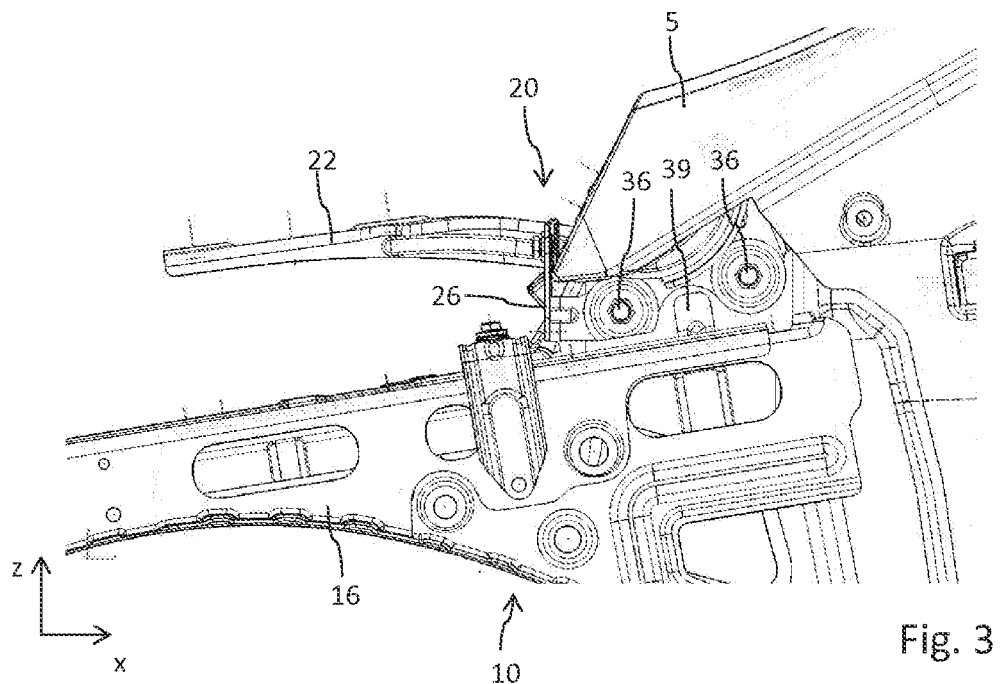
FIG. 3 an enlarged representation of the connection of a hood hinge to the support structure with body outside panel arranged thereon.
Figure 4:
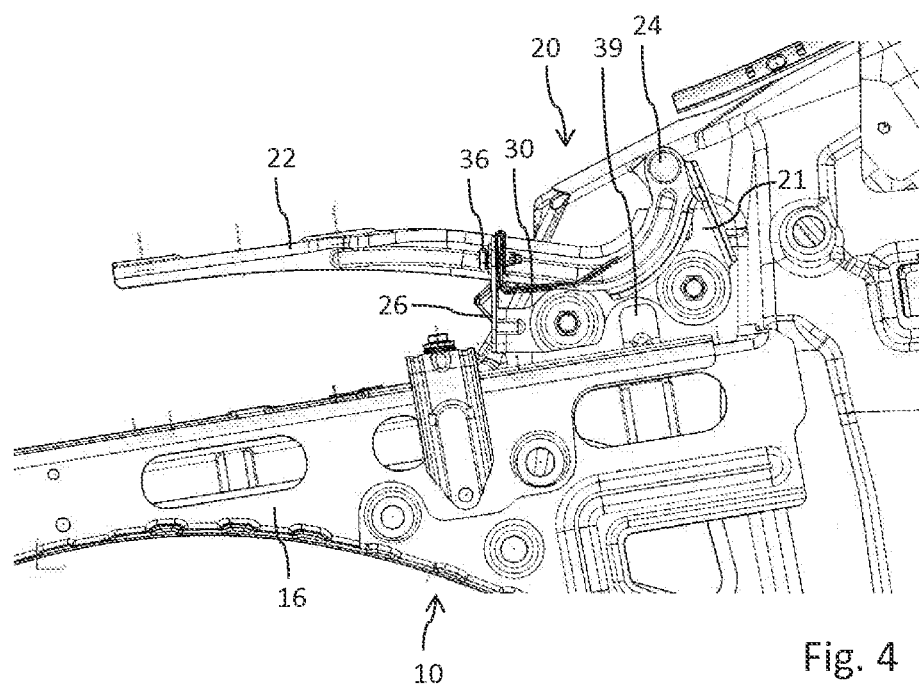
FIG. 4 a representation according to FIG. 3, however with disassembled body outside panel.

As is evident furthermore from the FIGS. 3 and 4, the fastening point 28 provided on the mounting bracket 26 is offset, with respect to the vehicle vertical axis (z), from the fastening points 29 of the fastening portion 25. Because of this offset in height the fastening elements 36 provided for the two fastening points 29 are still accessible from the outside even with a body outside panel 5 already arranged on the hinge 20 or fastened to the hinge 20.

The fastening element 36 interacting with the fastening points 28, 34 of mounting 26 and body outside panel 5 is still accessible in the final assembly configuration shown in FIG. 3 so that following a preliminary fixing of the body outside panel 5 on the hinge 20 and following a preassembly or preliminary fixing of the hinge 20 to the support structure 10, assembly and component tolerances both in the direction of the vehicle longitudinal axis (x) as well as in the direction of the vehicle vertical axis (z) and the vehicle transverse axis (y) can be compensated and preset gap dimensions between various body outside panels 5, 6 and the hood 3 can be maintained.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various change may be made in the function and arrangement of elements described in an exemplary embodiment without departing from the scope of the present disclosure as set forth in the appended claims and their legal equivalents.

The invention claimed is:

1. A hinge for the pivotable arrangement of a movable panel on a support structure of a motor vehicle, the hinge comprising:
   a basic part including:
      a fastening portion positioned in a first plane formed by a vertical axis (z) of the motor vehicle and a longitudinal axis (x) of the motor vehicle, wherein the fastening portion is configured to secure the hinge to the support structure, and
      at least one mounting bracket axially spaced from the fastening portion and configured to secure the hinge to at least one body outside panel, wherein the at least one mounting bracket is positioned in a second plane formed by the vertical axis and a vehicle transverse axis of the motor vehicle; and
   a hinge arm pivotally connected to the basic part at a hinge axis extending in an axial direction, the hinge arm configured to secure the hinge to the movable panel.

2. The hinge according to claim 1, wherein the mounting bracket is connected in one piece to the fastening portion.

3. The hinge according to claim 1, wherein the hinge arm is axially mounted between the mounting bracket and the fastening portion.

4. The hinge according to claim 1, wherein a flange-like mounting extends at a preset angle with respect to a plane of the fastening portion.

5. The hinge according to claim 1, wherein the mounting bracket comprises a fastening point configured to engage the body outside panel.

6. A motor vehicle body comprising a support structure, on which the hinge according to claim 1 is secured.

7. The motor vehicle body according to claim 6, wherein the fastening portion of the hinge is adjustably fastened to the support structure.

8. The motor vehicle body according to claim 6, wherein the fastening portion of the hinge comprises at least one fastening point for connection to the support structure.

9. The motor vehicle body according to claim 8, wherein the at least one fastening point of the fastening portion is located below a fastening point of the mounting bracket for the body outside panel based on the vehicle vertical axis (z).

10. The motor vehicle body according to claim 8, wherein the at least one fastening point of the fastening portion following the mounting bracket of the body outside panel on the hinge is accessible in the direction of the vehicle transverse axis (y) from the outside.

11. The motor vehicle body according to claim 6, wherein the mounting bracket of the hinge in mounting position on the support structure extends at least in sections in the plane formed by vehicle vertical axis (z) and vehicle transverse axis (y).

12. The motor vehicle body according to claim 6 further comprising an body outside panel having a fastening strap (32) forming a mounting angle on an inside of the body outside panel, the fastening strap extending parallel with and adjustably fastened to the mounting bracket of the hinge.

13. A motor vehicle body according to claim 6, wherein the fastening portion of the hinge comprises a cutout on a lower edge.

14. A motor vehicle with a motor vehicle body according to claim 6.

* * * * *